(12) United States Patent
Downer et al.

(10) Patent No.: US 6,307,346 B1
(45) Date of Patent: Oct. 23, 2001

(54) INDUCTION MOTOR LOAD LIMITING FOR POWER STEERING APPLICATIONS

(75) Inventors: Scott D. Downer; Stanley K. Fujii, both of Torrance; Wade E. Char, Gardena, all of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/553,843

(22) Filed: Apr. 20, 2000

(51) Int. Cl.[7] ....................................................... H02P 1/24
(52) U.S. Cl. ............................. 318/727; 318/49; 318/35; 318/51; 318/60; 318/432; 318/434; 318/567; 318/569; 388/903; 388/907.5
(58) Field of Search ................................ 318/727, 49, 35, 318/51, 60, 432, 434, 567, 564; 180/422; 701/42; 388/903, 907.5

(56) References Cited

U.S. PATENT DOCUMENTS

| | | |
|---|---|---|
| 4,702,335 * | 10/1987 | Cage et al. ............................ 180/142 |
| 5,345,154 * | 9/1994 | King ........................................ 318/49 |
| 5,709,281 * | 1/1998 | Sherwin et al. ...................... 318/727 |
| 6,152,254 * | 11/2000 | Phillips ................................. 180/422 |

* cited by examiner

*Primary Examiner*—Karen Masih
(74) *Attorney, Agent, or Firm*—Christopher DeVries

(57) ABSTRACT

A power steering system and induction motor load compensation algorithm or processing method for use in a vehicle. The power steering system comprises a power supply, a power steering motor, a steering subsystem, and a power steering controller coupled to the power supply. The controller processes a frequency command input corresponding to the power steering frequency requested by the steering subsystem and data contained in one or more software lookup tables to adjust the output frequency produced by the power supply to control the speed of the power steering, motor. The lookup tables are generated empirically and characterize the output power of the power supply at different system pressures over a range of motor speeds. The software lookup tables provide a power band that implements a power limiting state machine.

9 Claims, 1 Drawing Sheet

INDUCTION MOTOR LOAD LIMITING FOR POWER STEERING APPLICATIONS

BACKGROUND OF THE INVENTION

The present invention relates generally to electric and hybrid vehicles and, more particularly, to an improved power steering system and induction motor load limiting algorithm or method for use in electric and hybrid vehicles.

The assignee of the present invention designs and develops electric and hybrid vehicles. A previous power steering system for electric and hybrid vehicles involved the use of conventional belt-driven power steering systems or power steering systems having a pressure relief valve to control load limiting. The use of relief valves has a power and cost overhead. Belt-driven power steering systems are also less responsive than is desirable.

It would, therefore, be desirable to have an improved power steering system for use in electric and hybrid vehicles. It would also be desirable to have an improved induction motor load limiting algorithm or method for use in electric and hybrid vehicle power steering systems.

SUMMARY OF THE INVENTION

The present invention provides for an improved power steering system and a software algorithm or processing method for use in electric and hybrid vehicles. The vehicle power steering system comprises a power supply that is coupled to a power steering motor. A power steering controller is coupled to the power supply and receives inputs from a plurality of software lookup tables and a frequency command such as is derived from an accelerator pedal, for example. The power steering controller implements an improved induction motor load limiting software algorithm or processing method.

The software algorithm or processing method provides for induction motor load limiting to avoid excessive power consumption and hydraulic system pressure when the power steering system is in full-lock or near full-lock position. The power steering system does not require the use of a pressure sensor or a pressure relief valve as in certain conventional systems.

The software algorithm or processing method adjusts the speed of the power steering motor by reducing the power output of the power supply (instead of using a pressure relief valve) during extremely high load conditions in order to maintain a specified system pressure. The power output of the power supply is controlled by adjusting the output frequency produced by the power supply. The output power of the power supply changes at different output frequencies. Software lookup tables are generated empirically by characterizing the output power of the power supply at a plurality of (three) different system pressures over a range of motor speeds. The tables provide a power band that implements a power limiting state machine. Power calculations are performed at the output voltage signal frequency, since AC output current can only be calculated at the output frequency.

Excessive pressure is not generated and no relief valve is used. Also, the power steering system exerts a lower power consumption using the present invention compared to conventional systems.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENT

Figure 1:
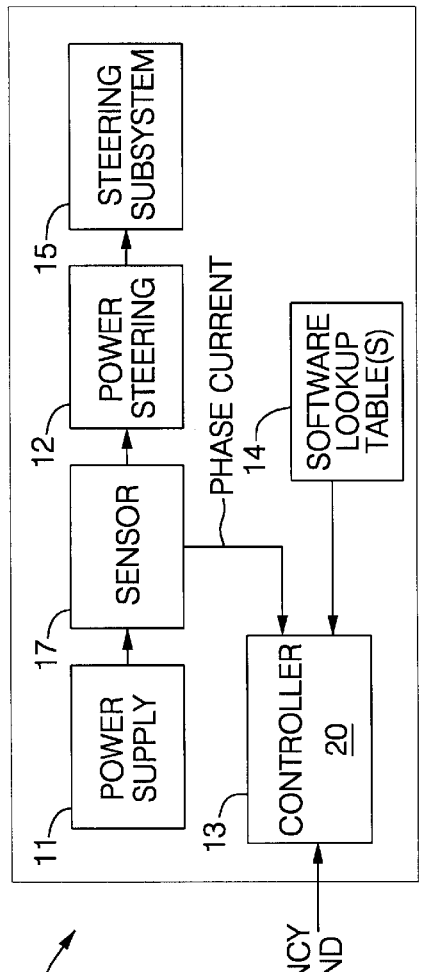
FIG. 1 illustrates an electric or hybrid vehicle employing an exemplary power steering system in accordance with the principles of the present invention.

Referring to the drawing figures, FIG. 1 illustrates an exemplary vehicle power steering system 10 in accordance with the present invention for use in an electric or hybrid vehicle 16. The power steering system 10 comprises a power supply 11 that is coupled to a power steering motor 12. The power steering motor 12 is coupled to a steering subsystem 15 that steers the electric or hybrid vehicle 16.

A power steering controller 13 coupled to the power supply 11 receives power steering frequency requests (frequency commands) derived from an accelerator pedal, for example, and inputs from a plurality of software lookup tables 14. The power steering controller 13 implements the present induction motor load limiting software algorithm 20 or processing method 20.

A phase current sensor 17, such as a Hall effect sensor, for example, is used to sense the phase current output of the power supply 11, and from which power is computed. The software lookup tables 14 are generated empirically and characterize the output power of the power supply 11 at a plurality of (three) different power steering system pressures over a range of speeds of the power steering motor 12. The software lookup tables 14 produce a power band that implements a power limiting state machine in the controller 13. Power calculations are performed at the output voltage signal frequency of the power supply 11.

In using the power steering system 10 and induction motor load limiting software algorithm 20 or processing method 20, excessive pressure is not generated and no relief valve is used. Also, the power steering system exerts a lower power consumption using the present invention compared to conventional systems.

Figure 2:
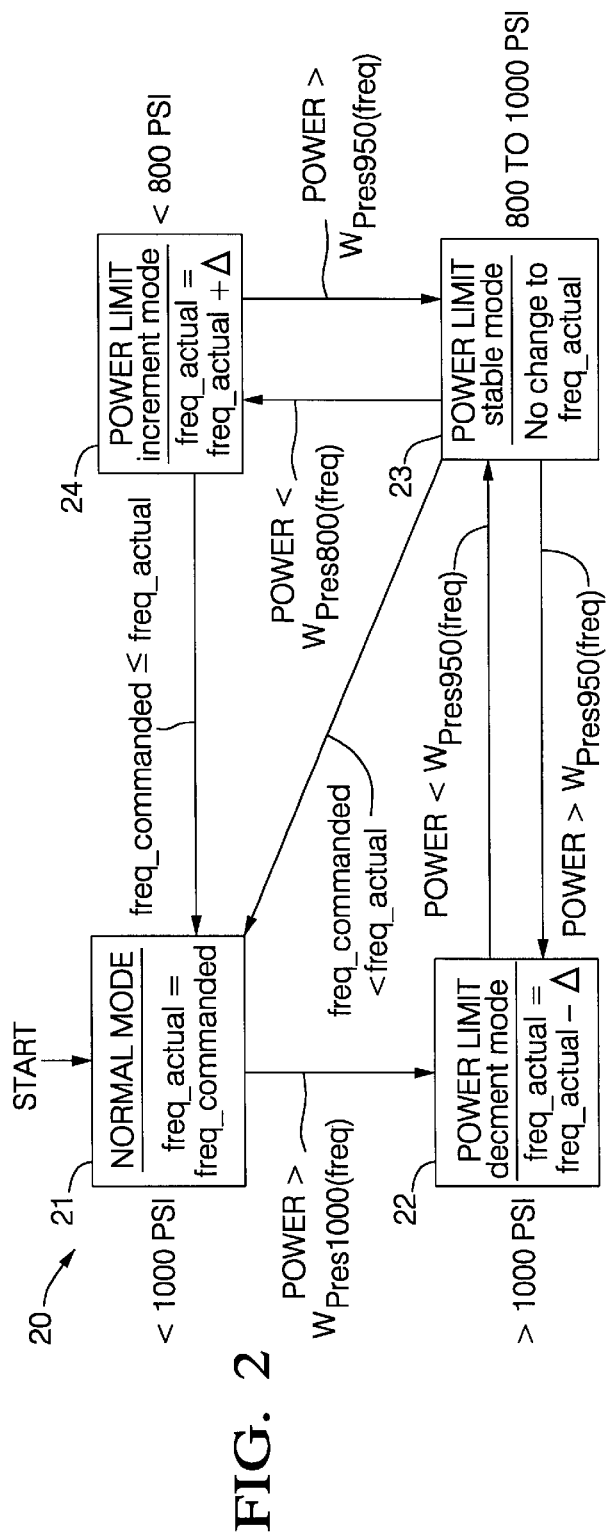
FIG. 2 is a state transition diagram illustrating an exemplary induction motor load limiting software algorithm or processing method in accordance with the principles of the present invention for use in the vehicle power steering system of FIG. 1.

FIG. 2 is a state transition diagram illustrating an exemplary induction motor load limiting power steering software algorithm 20 or processing method 20 in accordance with the principles of the present invention for use in the power steering system 10. The power steering software algorithm 20 or processing method 20 adjusts the power supplied by the power supply 11 by adjusting the output frequency during extremely high load conditions in order to maintain a specified pressure in the power steering system 10. The power output of the power supply 11 is controlled by adjusting the output voltage signal frequency produced by the power supply 11. The induction motor load limiting resulting from use of the software algorithm 20 or processing method 20 avoids excessive power consumption and hydraulic system pressure when the power steering system is in full-lock or near full-lock position.

Referring to FIG. 2, details of an exemplary power steering algorithm 20 or processing method 20 will now be discussed. In the following discussion and in FIG. 2, the freq_commanded signal is defined as the power steering frequency requested by the steering subsystem, the freq_actual signal is defined as the actual frequency output of the AC power steering waveform output by the power supply 11, and power is defined as the measured output power (volts*amps) of the power steering system 10. $W_{pres1000(freq)}$ is a calibrated table 14 of wattage values representing power output of the power supply 11 at 1000 psi (a first pressure value) as a function of frequency. $W_{pres950(freq)}$ is a calibrated table 14 of wattage values representing power output of the power supply 11 at 950 psi (a second pressure value) as a function of frequency. $W_{pres800(freq)}$ is a calibrated table 14 of wattage values representing power output of the power supply 11 at 800 psi (a third pressure value) as a function of frequency.

In the power steering algorithm or processing method 20, one or more software lookup tables 14 are generated that characterize the output power of the power supply at a plurality of different system pressures over a range of motor speeds. The output power is computed as a function of the high voltage bus and the output phase current. Then, a frequency command input corresponding to the power steering frequency requested by the steering subsystem and data from the lookup tables 14 are processed to adjust the output frequency produced by the power supply to control the speed of the power steering motor.

The processing performed by the power steering algorithm 20 or processing method 20 starts in a normal operating mode 21, where freq_actual is equal to freq_commanded. Thus, the actual frequency of the AC power steering waveform output by the power supply 11 is set equal to the power steering frequency requested by the steering subsystem 15.

If the power steering output produced by the steering subsystem is greater than the power output of the power supply 11 at 1000 psi as a function of frequency, a power limiting decrement mode 22 is initiated. In the power limiting decrement mode 22, the power steering frequency requested by the steering subsystem is decremented by a predetermined amount (Δ) so as to limit the power output of the power supply 11. In the power limiting decrement mode 22, freq_actual=freq_actual−Δ. The predetermined amount (Δ) is typically on the order of 1 to 10 Hertz per second.

If the power steering output produced by the steering subsystem is less than the power output of the power supply 11 at 950 psi as a function of frequency, a stable mode 23 is initiated. In the stable mode 23, no additional changes are made to the actual frequency output of the AC power steering waveform output by the power supply 11.

While operating in the stable mode 23, if the power steering frequency requested by the steering subsystem 15 becomes less than the actual frequency output of the AC power steering waveform output by the power supply 11, the power steering algorithm 20 or processing method 20 returns to the normal mode 21.

While operating in the stable mode 23, if the power steering output produced by the steering subsystem is less than the power output of the power supply 11 at 800 psi as a function of frequency, a power limiting increment mode 24 is initiated. In the power limiting increment mode 24, the power steering frequency requested by the steering subsystem is incremented by a predetermined amount (Δ) so as to limit the power output of the power supply 11. In the power limiting increment mode 24, freq_actual=freq_actual+Δ.

While operating in the power limiting increment mode 24, if the power steering output produced by the steering subsystem is greater than the power output of the power supply 11 at 950 psi as a function of frequency, a transition is made back to the power limiting stable mode 23, and no additional changes are made to the actual frequency output of the AC power steering waveform output by the power supply 11.

While operating in the stable mode 23, if the power steering output produced by the steering subsystem is greater than the power output of the power supply 11 at 1000 psi as a function of frequency, a transition is made back to the power limiting decrement mode 22, and the power steering frequency requested by the steering subsystem is decremented by a predetermined amount (Δ).

While operating in the power limiting increment mode 24, if the power steering frequency requested by the steering subsystem becomes less than the actual frequency output of the AC power steering waveform output by the power supply 11, the power steering algorithm 20 or processing method 20 returns to the normal mode 21.

Thus, an improved power steering system and induction motor load limiting algorithm or method for use in electric and hybrid vehicles have been disclosed. It is to be understood that the above-described embodiments are merely illustrative of one of the many specific embodiments that represent applications of the principles of the present invention. Clearly, numerous and other arrangements can be readily devised by those skilled in the art without departing from the scope of the invention.

What is claimed is:

1. A power steering system for use in a vehicle comprising:
   a power supply;
   a power steering motor coupled to the power supply;
   a steering subsystem coupled to the power steering motor that steers the vehicle; and
   a power steering controller coupled to the power supply for processing a frequency command input corresponding to the power steering frequency requested by the steering subsystem and data contained in at least one software lookup table to adjust an output frequency produced by the power supply to control the speed of the power steering motor.

2. The system recited in claim 1 wherein the at least one software lookup table contains data that corresponds to desired operating speeds of the power steering motor as a function of the commanded frequency input for different load conditions.

3. The system recited in claim 1 wherein the at least one software lookup table produces a power band that implements a power limiting state machine.

4. The system recited in claim 1 wherein the controller adjusts the speed of the power steering motor by reducing power output of the power supply during high load conditions to maintain a specified system pressure.

5. The system recited in claim 1 wherein the at least one software lookup table is generated empirically by characterizing output power of the power steering controller power supply at three different system pressures over a range of motor speeds.

6. A method for controlling a power steering system of a vehicle, the power steering system comprising a power supply, a power steering motor, a steering subsystem, and a power steering controller, the algorithm comprising the steps of:
   generating at least one software lookup table that characterizes the output power of the power supply at a plurality of different system pressures over a range of motor speeds; and processing a frequency command input corresponding to the power steering frequency requested by the steering subsystem and data from the at least one lookup table to adjust an output frequency produced by the power supply to control the speed of the power steering motor.

7. The method recited in claim 6 wherein the at least one software lookup table produces a power band that implements a power limiting state machine in the controller.

8. The method recited in claim 6 wherein the processing step comprises the steps of:

operating in a normal operating mode, wherein the actual frequency of the AC power steering waveform output by the power supply is set equal to the power steering frequency requested by the steering subsystem;

if the power steering output produced by the steering subsystem is greater than the power output threshold as a function of frequency, the power steering system initiates a power limiting decrement mode, wherein the power steering frequency requested by the steering subsystem is decremented by a predetermined amount to limit the power output of the power supply;

if the power steering output produced by the steering subsystem is less than the power output threshold at a second pressure value as a function of frequency, the power steering system initiates a stable mode, wherein no changes are made to the actual frequency output of the AC power steering waveform output by the power supply;

while operating in the stable mode, returning to the normal mode if the power steering frequency requested by the steering subsystem becomes less than the actual frequency output of the AC power steering waveform output by the power supply;

while operating in the stable mode, initiating a power limiting increment mode if the power steering output produced by the steering subsystem is less than the power output threshold at a third pressure value as a function of frequency, wherein the power steering frequency requested by the steering subsystem is incremented by a predetermined amount to limit the power output of the power supply;

while operating in the stable mode, transitioning back to the power limiting decrement mode if the power steering output produced by the steering subsystem is greater than the power output threshold at the first pressure value as a function of frequency to decrement the power steering frequency requested by the steering subsystem by a predetermined amount;

while operating in the power limiting increment mode, transitioning back to the power limiting stable mode if the power steering frequency requested by the steering subsystem is greater than the power output threshold at the second pressure value as a function of frequency, wherein no changes are made to the actual frequency output of the AC power steering waveform output by the power supply; and while operating in the power limiting increment mode, returning to the normal mode if the power steering frequency requested by the steering subsystem becomes less than the actual frequency output of the AC power steering waveform output by the power supply.

9. The method recited in claim 8 wherein the first pressure value is substantially 1000 psi, the second pressure value is substantially 950 psi, and the third pressure value is substantially 800 psi.

* * * * *